(12) United States Patent
Tanaka

(10) Patent No.: US 7,436,544 B2
(45) Date of Patent: Oct. 14, 2008

(54) IMAGE PROCESSOR

(75) Inventor: Seiji Tanaka, Saitama (JP)

(73) Assignee: Fujifilm Corporation, Tokyo (JP)

( * ) Notice: Subject to any disclaimer, the term of this patent is extended or adjusted under 35 U.S.C. 154(b) by 875 days.

(21) Appl. No.: 10/842,552

(22) Filed: May 11, 2004

(65) Prior Publication Data

US 2004/0227836 A1 Nov. 18, 2004

(30) Foreign Application Priority Data

May 13, 2003 (JP) ............... 2003-134494

(51) Int. Cl.
*H04N 1/40* (2006.01)
(52) U.S. Cl. ...................... 358/1.9; 382/298
(58) Field of Classification Search .......... 358/1.2, 358/1.9, 2.1, 451; 382/298–300
See application file for complete search history.

(56) References Cited

U.S. PATENT DOCUMENTS

| | | | | |
|---|---|---|---|---|
| 5,157,515 A | * | 10/1992 | Hasegawa | ............ 358/412 |
| 5,933,137 A | | 8/1999 | Anderson | |
| 5,946,527 A | * | 8/1999 | Salgado et al. | ............ 399/82 |
| 6,064,444 A | * | 5/2000 | Miyazaki et al. | ............ 348/581 |
| 7,194,217 B2 | * | 3/2007 | Hosoi | ............ 399/75 |

FOREIGN PATENT DOCUMENTS

| | | |
|---|---|---|
| EP | 232081 B1 * | 3/1994 |
| JP | 05-273948 A | 10/1993 |
| JP | 09-035053 A | 2/1997 |
| JP | 2001-119570 A | 4/2001 |
| JP | 2001-333273 A | 11/2001 |

* cited by examiner

*Primary Examiner*—Thomas D Lee
*Assistant Examiner*—Stephen M Brinich
(74) *Attorney, Agent, or Firm*—Birch, Stewart, Kolasch & Birch, LLP

(57) ABSTRACT

A control section of a digital camera generates a plurality of pieces of reduced image data having each different reduction ratio from original image data at the time of image viewing. The result is stored in a memory. When receiving a user instruction for reduction up an image to be displayed on a display section, the control section selects from the memory either the original image data or a plurality of reduced image data stored therein based on an image enlargement ratio and the size of display image data for output to the display section. Then, thus selected image data is subjected to a reduction process so that the display image data is generated. The resulting display image data is provided to the display section.

14 Claims, 7 Drawing Sheets

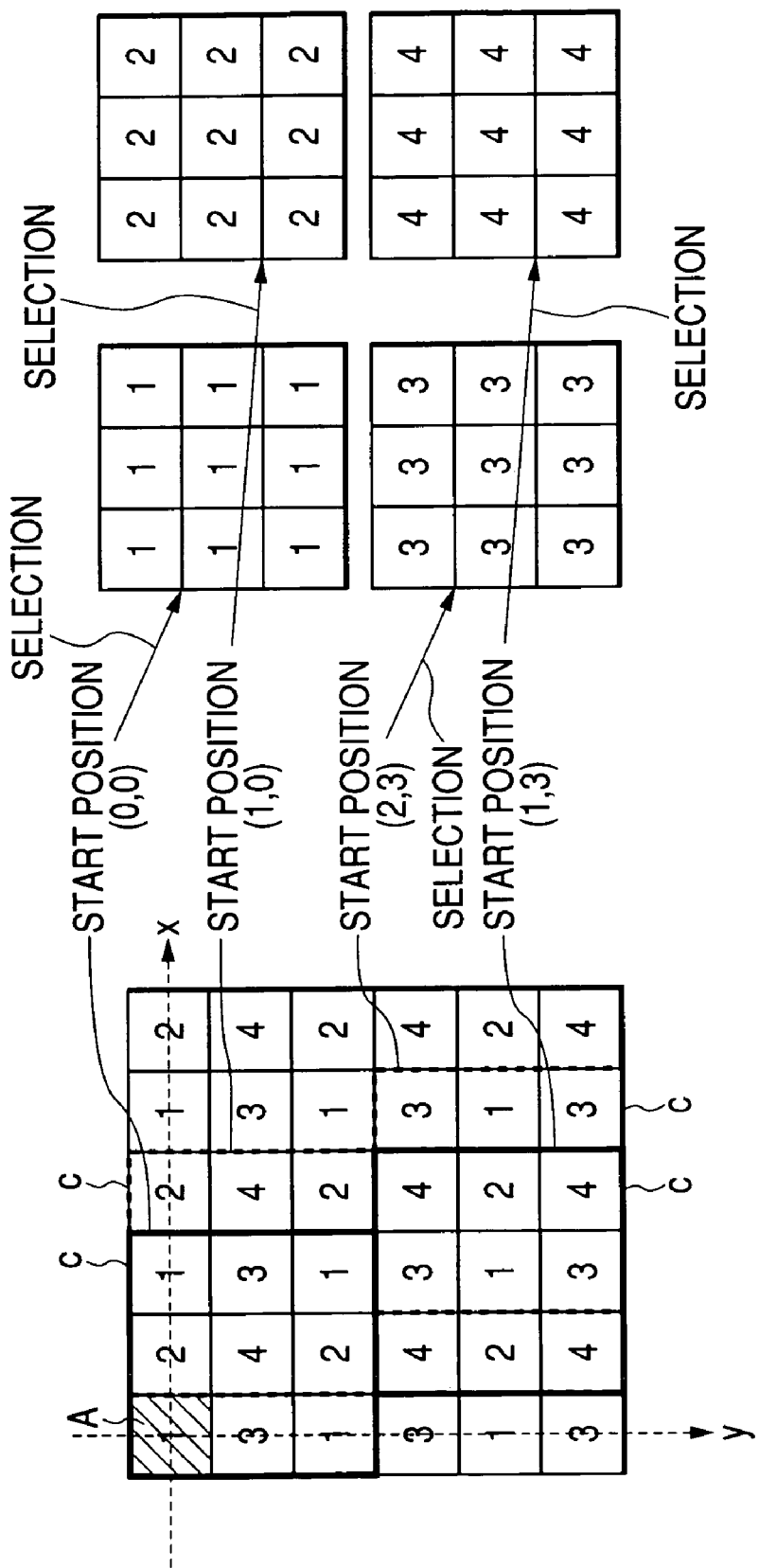

IMAGE PROCESSOR

This Nonprovisional application claims priority under 35 U.S.C. §119(a) on Patent Application No(s) 2003-134494, filed in JAPAN on May 13, 2003, the entire contents of which are hereby incorporated by reference.

FIELD OF THE INVENTION

The present invention relates to an image processor for processing images for display on a display.

BACKGROUND OF THE INVENTION

With a digital camera of a general type, a display exemplified by a display can show the result of image processing that is executed for image reducing or enlarging at the time of still image viewing. In such a case, in response to every instruction of image reduction or enlargement, the digital camera applies a reduction process and an enlargement process to original image data to display the result on the display.

Alternatively, another type of a device has been proposed. That is, original image data is in advance reduced for storage as reduced image. In accordance with an image scaling ratio, a selection is made between the original image data and the reduced image data. Thus selected image data is subjected to a scaling process for display on a display the resulting image, i.e., enlarged image or reduced image. As an example, refer to JP-A-2001-119570.

Still another type of a device has been proposed. That is, original image data is used as a basis to generate various types of reduced image data for storage in advance. In accordance with an image reduction ratio chosen by a user, a selection is made among thus stored reduced image data for display on a display. As an example, refer to JP-A-2001-333273.

The problem with the above types of digital cameras is that, however, every time an instruction comes for image enlargement or reduction, there needs to subject the original image data to a reduction process. Thus, it takes time therefor.

With the device of JP-A-2001-119570, image processing can be completed at a higher speed. This is because a selection is first made between the original image data and the reduced image data, and only thus selected image data is applied with a scaling process for image enlargement or reduction. The problem here is that, however, for image enlargement therewith, the reduced image data is the one to be enlarged, unfavorably leading to image degradation.

SUMMARY OF THE INVENTION

The present invention is proposed in consideration of the above problems, and an object thereof is to provide an image processor with which the image quality remains good through image processing. As a result of our intensive studies, we have found that the object can be attained by adoption of the following constitution, thereby achieving the invention.

More specifically, the invention is as follows:

(1). An image processor for processing an image to be displayed on a display, the image processor comprising:

a storage that stores (a) original image data and (b) at least one reduced image data that is reduced from (a) the original image data by a predetermined reduction ratio; and a display image data generator that generates display image data to be output to the display, based on (a) the original image data and (b) the at least one reduced image data;

wherein the display image data generator generates the display image data by applying a reduction process to first image data so that the first image data has a size of the display image data, the first image data being selected from (a) the original image data and (b) the at least one reduced image data in accordance with a size of the display image data and an image enlargement ratio to be displayed on the display.

(2). The image processor according to item (1), wherein (a) the original image data and (b) the at least one reduced image data each has a display area to be displayed on the display in accordance with the enlargement ratio.

(3). The image processor according to item (1), wherein the display image data generator applies the reduction process to the first image data; each of (a) the original image data and (b) the at least one reduced image data has the display area; the display area is determined in accordance with the size of the display image data and the image enlargement ratio; and the first image data has the highest reduction ratio among image data each of which display area is larger than the size of the display image data.

(4). The image processor according to item (1), which further comprises a first reduced image data generator that generates (b) the at least one reduced image data that is reduced (a) the original image data by a predetermined reduction ratio.

(5). The image processor according to item (1), which further comprises a second reduced image data generator that generates plural (b) the reduced image data every different reduction ratio depending on a size of a region of the storage available for data storage.

(6). The image processor according to item (1), wherein (b) the at least one reduced image data stored in the storage has a plurality of patterns that are generated through pixel displacement with the same reduction ratio at a time of generating (b) the reduced image data from (a) the original image data;

the display image data generator applies the reduction process to the first image data that forms a pattern corresponding in position to the display area on the original image data; each of (a) the original image data and (b) the plurality of patterns of the reduced image data has the display area; the display area is determined in accordance with the size of the display image data and the image enlargement ratio; and the first image data has the highest reduction ratio among image data each of which display area is larger than the size of the display image data.

(7). The image processor according to item (6), wherein the display image data generator applies the reduction process to various-patterned reduced image data, the various-patterned reduced image data being sequentially changed responding to a movement of the display area on the original image data.

(8). An image processor for processing an image to be displayed on a display, the image processor comprising:

means for storing (a) original image data and (b) at least one reduced image data that is reduced from (a) the original image data by a predetermined reduction ratio; and means for generating a display image data to be output to the display, based on (a) the original image data and (b) the at least one reduced image data;

wherein the means for generating the display image data apply a reduction process to first image data so that the first image data has a size of the display image data, the first image data being selected from (a) the original image data and (b) the at least one reduced image data in accordance with a size of the display image data and an image enlargement ratio to be displayed on the display.

(9). The image processor according to item (8), wherein (a) the original image data and (b) the at least one reduced image data each has a display area to be displayed on the display in accordance with the enlargement ratio.

(10). The image processor according to item (8),
wherein the means for generating the display image data apply the reduction process to the first image data that forms the display area; each of (a) the original image data and (b) the at least one reduced image data has the display area; the display area is determined in accordance with the size of the display image data and the image enlargement ratio; and the first image data has the highest reduction ratio among image data each of which display area is larger than the size of the display image data.

(11). The image processor according to item (8), which further comprises first means for generating reduced image data that generate (b) the at least one reduced image data that is reduced (a) the original image data by a predetermined reduction ratio.

(12). The image processor according to item (8), which further comprises second means for generating reduced image data that generate plural (b) the reduced image data every different reduction ratio depending on a size of a region of the storage available for data storage.

(13). The image processor according to item (8), wherein (b) the at least one reduced image data stored in the storage has a plurality of patterns that are generated through pixel displacement with the same reduction ratio at a time of generating (b) the reduced image data from (a) the original image data;

the means for generating the display image data apply the reduction process to the first image data that forms a pattern corresponding in position to the display area on the original image data; each of (a) the original image data and (b) the plurality of patterns of the reduced image data has the display area; the display area is determined in accordance with the size of the display image data and the image enlargement ratio; and the first image data has the highest reduction ratio among image data each of which display area is larger than the size of the display image data.

(14). The image processor according to claim (13) wherein the means for generating the display image data apply the reduction process reduction process to various-patterned reduced image data, the various-patterned reduced image data being sequentially changed responding to a movement of the display area on the original image data.

With a structure of items (1) and (8), the display image data is generated through a reduction process, favorably providing the display with images high in quality.

With a structure of items (3) and (10), any image data having the highest reduction ratio is reduced. Accordingly, image processing can be done at higher speed.

With a structure of items (5) and (12), the storage can be efficiently utilized.

With a structure of items (6) and (13), out of the reduced image data of a plurality of patterns generated through pixel displacement at the time of generating the reduced image from the original image With a structure of items (7) and (14), the reduced image is changed in pattern responding to the movement of the display area. Accordingly, even if the display area is moved, image display can be smoothly done.

BRIEF DESCRIPTION OF THE DRAWING

FIG. 5A is a diagram showing image data of 6 by 6 pixels, 5B is a diagram showing image data as a result of reducing the image data of 6 by 6 pixels into a half through a general reduction process, and FIG. 5C is a diagram showing a plurality of pieces of image data as a result of reducing the image data of 6 by 6 pixels into a half through a reduction process using the digital camera of the second embodiment.

FIGS. 7A and 7B are both a diagram showing the image data stored in the memory of the digital camera of the second embodiment, and specifically, FIG. 7A is a diagram showing original image data for generating an original image, and FIG. 7B is a diagram showing a reduced image group including 4 patterns of reduced image data derived by reducing the original image data of FIG. 7A into a half.

DETAILED DESCRIPTION OF THE INVENTION

First Embodiment

Figure 1:
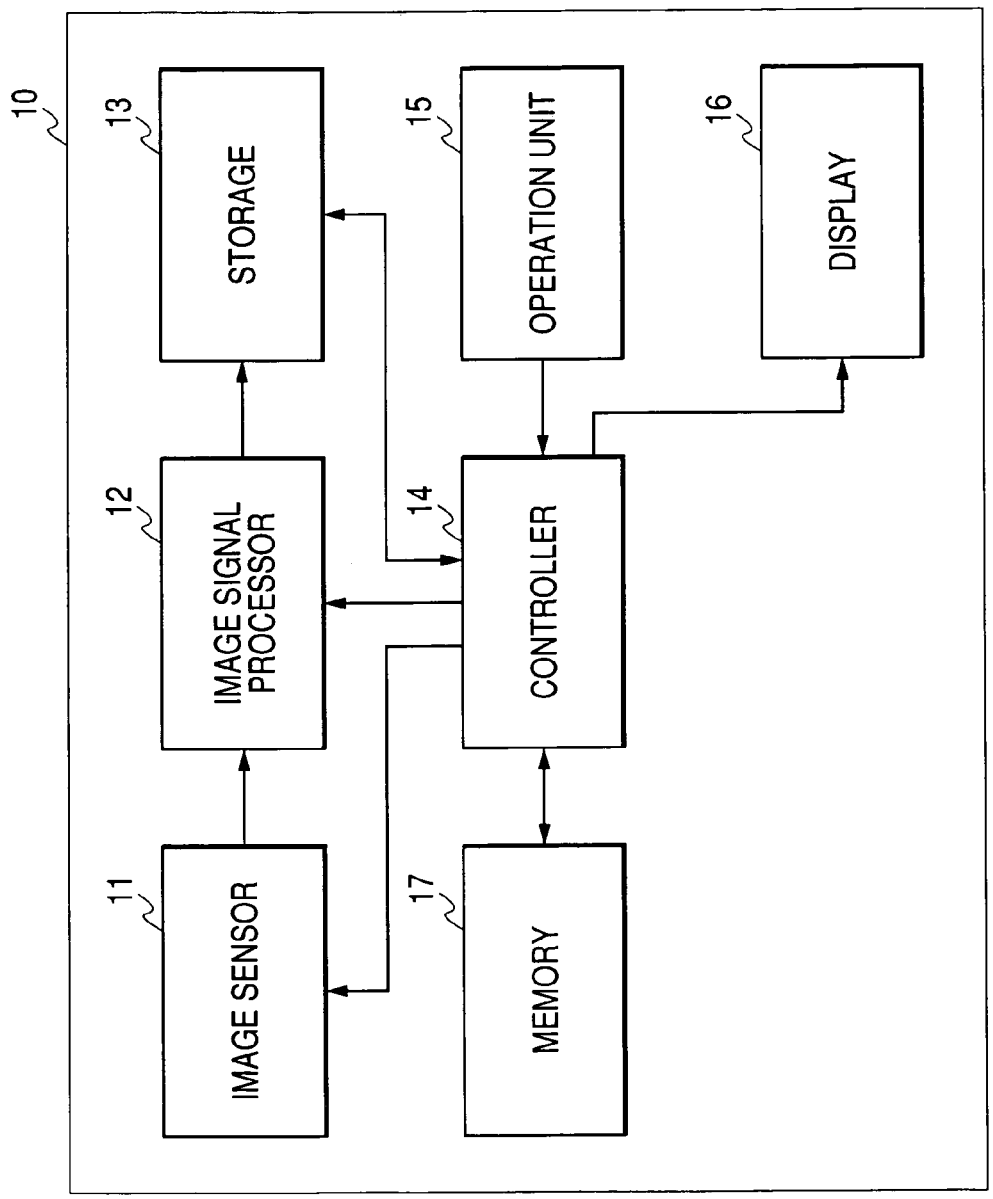
FIG. 1 shows a diagram showing the schematic structure of a digital camera for illustrating a first embodiment of the present invention.

FIG. 1 is a diagram showing the schematic structure of a digital camera for illustrating a first embodiment of the present invention.

A digital camera 10 is provided with an image sensor 11 (e.g. image pick-up device or image capturing device), an image signal processor 12, a storage 13, a controller 14, an operation unit 15, a display 16, and memory 17.

The image sensor 11 includes a lens, a CCD (Charge-Coupled Device), or other device as would be envisioned by one skilled in the art, for sensing an object image. The sensed image is input to the image signal processor 12, in which image data provided by the image sensor 11 is compressed, for example. Thus processed image data (in the below, this image data is also referred to as original image data) is stored in the storage 13. The storage 13 is the one for storing the original image data.

The controller 14 is the one for controlling the digital camera 10, and includes a processor that operates based on a predetermined program. The controller 14 reads the original image data stored in the storage 13 into the memory 17. From the original image data, generated are a plurality of pieces of reduced image data each having a different reduction ratio. The resulting reduced image data is stored in the memory 17 together with the original image data. Note here that a determination factor for how many pieces the reduced image data are to be generated depends on the region size of the memory 17 available for data storage. For example, when such a region is large in size, the reduced image data will be generated in greater numbers, and when the reduced image is small in size, the reduced image data will be less in number.

Based on the original image data or a plurality of pieces of reduced image data stored in the memory 17, the controller 14 generates display image data. The resulting display image data is forwarded to the display 16. Here, the display image data is the one used for image display on the display 16 at the time of image viewing. In the present embodiment, the display image data is in VGA (Video Graphics Array) size (640 pixels wide by 480 pixels high).

Based on the VGA size and the enlargement ratio of an image to be displayed on the display 16 at the time of image viewing, the controller 14 selects one of the original image data and a plurality of pieces of reduced image data from the memory 17. Thus selected image data is then applied with a reduction process so that the display image data is generated.

The operation unit 15 is structured by user input means, such as a button, a jog dial, a touch screen sensor, a voice activated command generator and others for receiving, from the outside, information about the digital camera 10, e.g., information about function selection, information about image sensing instruction, and information about various settings. After the reduction process by the controller 14, the resulting image data of VGA size is changed for display by the display 16 into the display screen size using a display driver that is not shown, for example. Here, in the present embodiment, the display screen size of the display 16 is presumably the VGA size.

The memory 17 is a working memory for data processing by the controller 14. The memory 17 temporarily stores the original image data read from the storage 13, and a plurality of pieces of reduced image data generated from the original image data.

Described next is the operation of the digital camera 10 by referring to FIG. 2.

Figure 2:
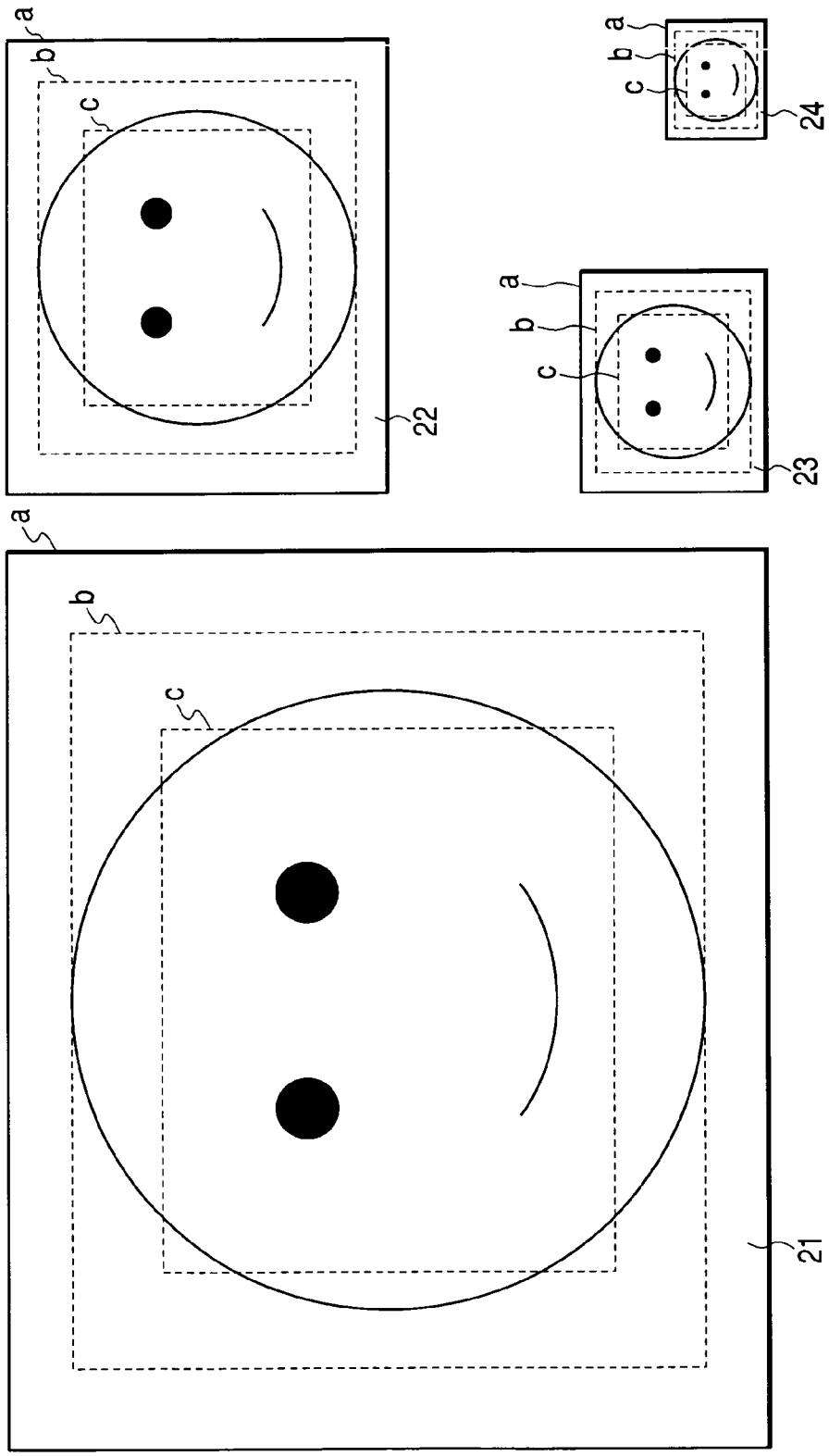
FIG. 2 shows diagram showing an exemplary image based on image data to be stored in memory of the digital camera of the first embodiment.

FIG. 2 is a diagram showing an exemplary image based on the image data stored in the memory 17 of the digital camera 10 of the first embodiment.

When a user designates any image for viewing through the operation unit 15 of the digital camera 10 and makes an instruction of reproduction, the controller 14 responsively reads original image data of thus designated image from the storage 13 to the memory 17. Then, based on the region of the memory 17 available for data storage, a plurality of pieces of reduced image data are generated for storage into the memory 17. FIG. 2 shows images stored in the memory 17 at this time.

As shown in FIG. 2, the memory 17 stores user-designated original image 21, and reduced images 22, 23, and 24. Specifically, the reduced image 22 is the one derived by reducing the original image 21 into a half, the reduced image 23 into a quarter, and the reduced image 24 into an eighth. The following shows only the width sizes of these images.

Original image 21: 5120 pixels in width
Reduced image 22: 2560 pixels in width
Reduced image 23: 1280 pixels in width
Reduced image 24: 640 pixels in width (VGA size)

For each of these images, indicated is a display area, which is determined by the VGA size and the enlargement ratio (×1, ×2, and ×3) of the image for display on the display 16. Herein, the VGA size is equal to the size of the display image data to be output to the display 16. The display area is the region of an image that can be entirely displayed on the display screen of the display 16. The display area moves on the displayed image in association with the movement thereof through the operation of the operation unit 15. Herein, information about the display area may be stored in advance in the storage 13 or others. Alternatively, the controller 14 may perform a computation to derive the display area for every image viewing.

A reference character a of FIG. 2 denotes the display area when the enlargement ratio of an image to be displayed on the display 16 is ×1, a reference character b denotes the display area for the enlargement ratio of ×2, and a reference character c denotes the display area for the enlargement ratio of ×3. The following shows only the width sizes of these images.

Original image 21: b=4000 pixels in width, c=2400 pixels in width
Reduced image 22: b=2000 pixels in width, c=1200 pixels in width
Reduced image 23: b=1000 pixels in width, c=600 pixels in width
Reduced image 24: b=500 pixels in width, c=300 pixels in width After generating a plurality of pieces of reduced image data, the controller 14 first reads from the memory 17 the reduced image 24 of VGA size for output to the display 16. In response thereto, the display 16 displays on its display screen thus input reduced image 24. As such, whenever an instruction comes for image viewing, the digital camera 10 of the present embodiment responsively displays on the display 16 a reduced image data as a result of reducing the original image data into VGA size.

With the reduced image 24 displayed on the display screen, when a user depresses a zoom key once, the controller 14 makes a selection from the original image data and the reduced image data for those having the display area b larger than the VGA size. In this example, because the VGA size is 640 pixels in width, the original image 21, and the reduced images 22 and 23, all having the larger display area b are selected.

Then, out of thus selected original image 21 and the reduced images 22 and 23, the controller 14 selects the reduced image 23 having the highest reduction ratio. In the reduced image 23, the image in the display area b is reduced to the VGA size with an reduction ratio of 640/1000. The resulting image data is then output to the display 16.

With the image derived by doubling in size the reduced image 24 displayed on the display screen, when the user depresses the zoom key once more, the controller 14 makes a selection from the original image data and the reduced image data for those having the display area c larger than the VGA size. In this example, because the VGA size is 640 pixels in width, selected will be the original image 21 and the reduced image 22 both having the larger display area c.

Then, out of thus selected original image 21 and the reduced image 22, the controller 14 selects the reduced image 22 having the higher reduction ratio. In the reduced image 22, the image in the display area c is reduced to the VGA size with a reduction ratio of 640/1200. The resulting image data is then output to the display 16.

Figure 3:
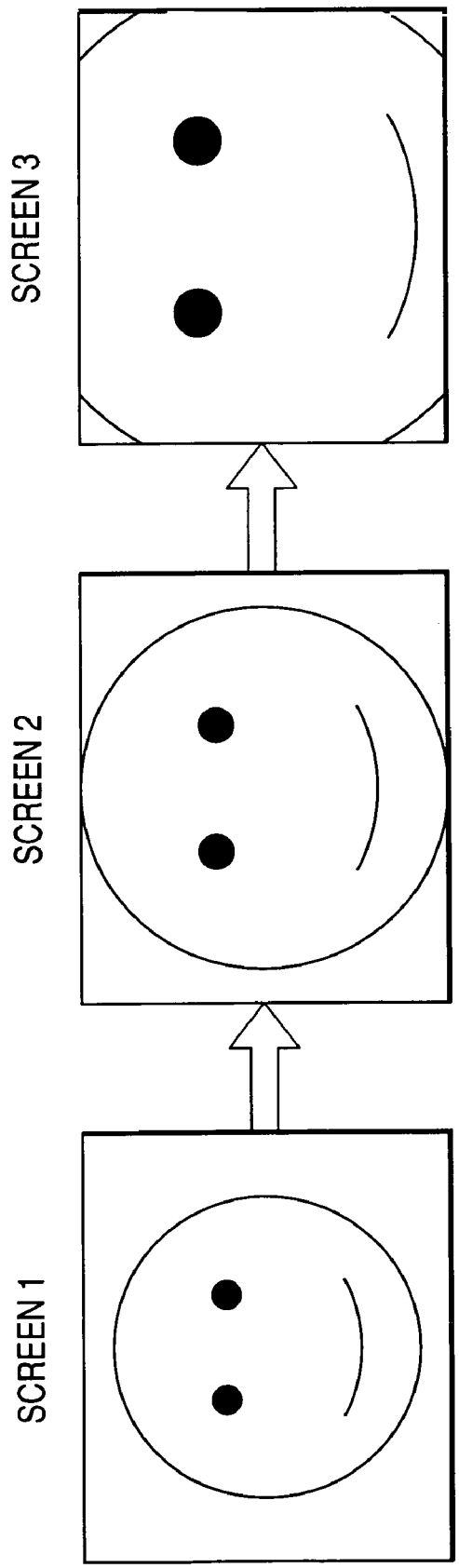
FIG. 3 shows a diagram showing the screen change in the case where a enlargement process is executed in the digital camera of the first embodiment.

FIG. 3 is a diagram showing the screen change in the case where a enlargement process is executed in the digital camera 10 of the first embodiment.

As shown in FIG. 3, the display screen of the display 16 is first displaying the reduced image 24 (screen 1). When the user depresses the zoom key once, the screen responsively displays an image generated by reducing the image in the display area b of the reduced image 23 (screen 2). Responding to depression of the zoom key once again, the screen accordingly displays an image generated by reducing the image in the display area c of the reduced image 22 (screen 3).

Described next is the case of moving, through the operation of a cursor key, the image as a result of enlarging the reduced image 24 displayed on the display 16. In this case, in association with the cursor key movement, the display areas b and c of the images of FIG. 2 also move. Every time the display areas b and c move, the controller 14 reduces again the images in the new display areas into the VGA size for output to the display 16.

For example, with the screen 2 of FIG. 3, when the user moves the image to the right, the display area b of the reduced image 23 of FIG. 2 also moves to the right. Responding to such a movement of the display area b of the reduced image 23, the controller 14 repeatedly reduces the image in the display area b into the VGA size for output to the display 16. Thereby, the display screen of the display 16 displays images in a row. Similarly to the case of screen 3, responding to the movement of the display area c of the reduced image 22, the controller 14 repeatedly reduces the image in the display area c into the VGA size for output to the display 16.

As described in the foregoing, according to the present embodiment, the controller 14 always executes a reduction process to the original image data or a plurality of pieces of reduced image data, and the resulting enlarged image is displayed on the display 16. In such a manner, neither the original image data nor the reduced image data is applied with the enlargement process, successfully preventing image degradation often occurring to images having been enlarged prior to display on the display 16.

Further, prior to executing a reduction process, the controller 14 first makes a selection from the original image data and the reduced image data for those having the larger display area than the VGA size to derive the one having the highest reduction ratio. In this manner, only the image data smallest in size is subjected to the reduction process, successfully shortening the time taken for image enlargement.

Still further, when generating a plurality of pieces of reduced image data from original image data, the controller 14 determines how many pieces of reduced image data are to be generated in consideration of the region size of the memory 17 available for data storage. Accordingly, even if the memory 17 is not so available for data storage, the process can be done with flexibility.

Second Embodiment

Figure 4:
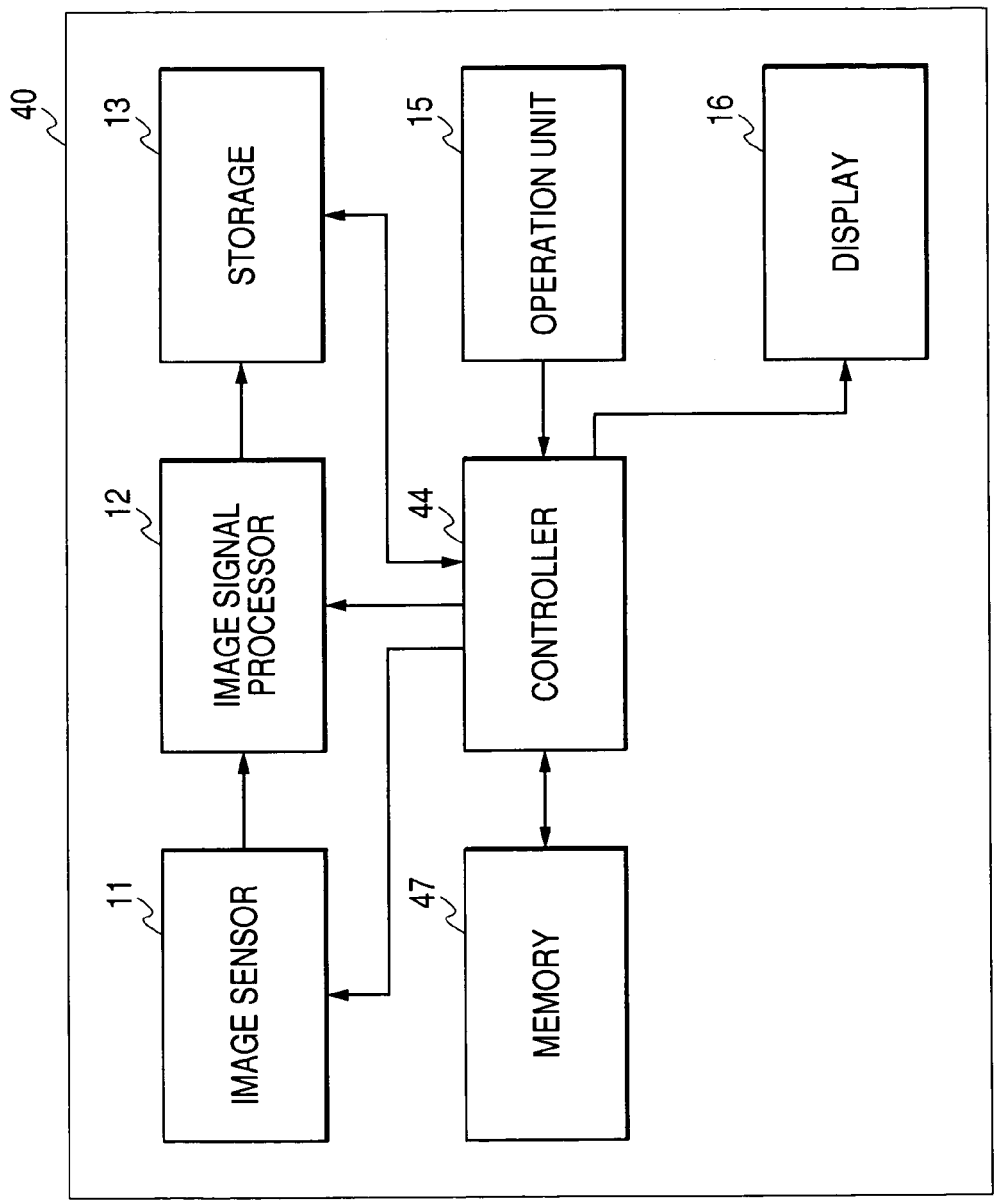
FIG. 4 shows a diagram showing the schematic structure of a digital camera for illustrating a second embodiment of the present invention.

FIG. 4 is a diagram showing the schematic structure of a digital camera 40 for illustrating a second embodiment of the present invention. Herein, any component identical to that of FIG. 1 is provided with the same reference numeral for description.

The digital camera 40 is provided with the image sensor 11, the image signal processor 12, the storage 13, a controller 44, the operation unit 15, the display 16, and memory 47.

The controller 44 is the one for controlling over the digital camera 40, and is mainly structured by a processor that operates based on a predetermined program. The controller 44 reads original image data stored in the storage 13 to the memory 47. From the original image data, generated are a plurality of reduced image groups each having a different reduction ratio. Herein, the reduced image group is the one including a plurality of pieces of reduced image data all sharing the same reduction ratio but varying in pattern. Thus generated reduced image groups are stored in the memory 47 together with the original image data. Note here that a determination factor for how many the reduced image groups are to be generated is the region size of the memory 47 available for data storage. For example, when such a region is large in size, the reduced image groups will be generated more in number, and when small in size, the groups will be generated less in number.

Described now is a plurality of pieces of reduced image data all sharing the same reduction ratio but varying in pattern.

Figures 5A, 5B, 5C:
FIGS. 5A to 5C are all a diagram for illustrating reduced image data, sharing the same reduction ratio but varying in pattern, generated by a controller of the digital camera of the second embodiment, and specifically.

FIGS. 5A to 5C are all a diagram for illustrating the reduced image data to be generated by the controller 44, all sharing the same reduction ratio but varying in pattern. Specifically, FIG. 5A is a diagram showing image data of 6 by 6 pixels, 5B is a diagram showing image data as a result of reducing the image data of 6 by 6 pixels into a half through a general reduction process, and FIG. 5C is a diagram showing a plurality of pieces of image data as a result of reducing the image data of 6 by 6 pixels into a half through a reduction process using the digital camera of the present embodiment. In FIGS. 5A to 5C, every pixel is numbered for description.

For reducing image data of 6 by 6 pixels into a half, pixel decimation will be generally done. In this example, from pixels 1 to 4 of FIG. 5A, the pixels 2, 3, and 4 are dropped so that such reduced image data as FIG. 5B is generated. In an alternate manner, an RGB average may be taken for the pixels 1 to 4 to reduce into a pixel.

As shown in FIG. 5C, the controller 44 of the digital camera 40 generates 4 patterns of reduced image data all sharing the same reduction ratio through pixel displacement at the time of generating the reduced image.

That is, the controller 44 generates the following reduced image data: the reduced image data structured by nine pixels 1 as a result of pixel decimation of the pixels 2 to 4 out of those 1 to 4 of FIG. 5A; the reduced image data structured by nine pixels 2 as a result of pixel decimation of the pixels 1, 3, and 4 out of those 1 to 4; the reduced image data structured by nine pixels 3 as a result of pixel decimation of the pixels 1, 2, and 4 out of those 1 to 4; and the reduced image data structured by nine pixels 4 as a result of pixel decimation of the pixels 1 to 3 out of those 1 to 4. Herein, a reduction ratio is a determination factor for how many patterns are to be generated by the controller 44 for the reduced image data. For example, with the reduction ratio of 0.5, 4 patterns will be generated, and with the reduction ratio of 0.25, 16 patterns.

Based on the original image data or the various-patterned reduced image data included in a plurality of reduced image groups all stored in the memory 47, the controller 44 generates display image data for output to the display 16.

In accordance with the VGA size and the enlargement ratio of the image to be displayed on the display 16 at the time of image viewing, the controller 44 selects from the memory 47 either the original image data or the reduced image data varying in pattern stored therein. Then, thus selected image data is subjected to a reduction process so that the display image data is generated.

The memory 47 is work memory for data processing by the controller 44. The memory 47 temporarily stores the original image data read from the storage 13, and a plurality of pieces of reduced image data generated from the original image data.

Described next is the operation of the digital camera 40 by referring to FIG. 6.

Figure 6:
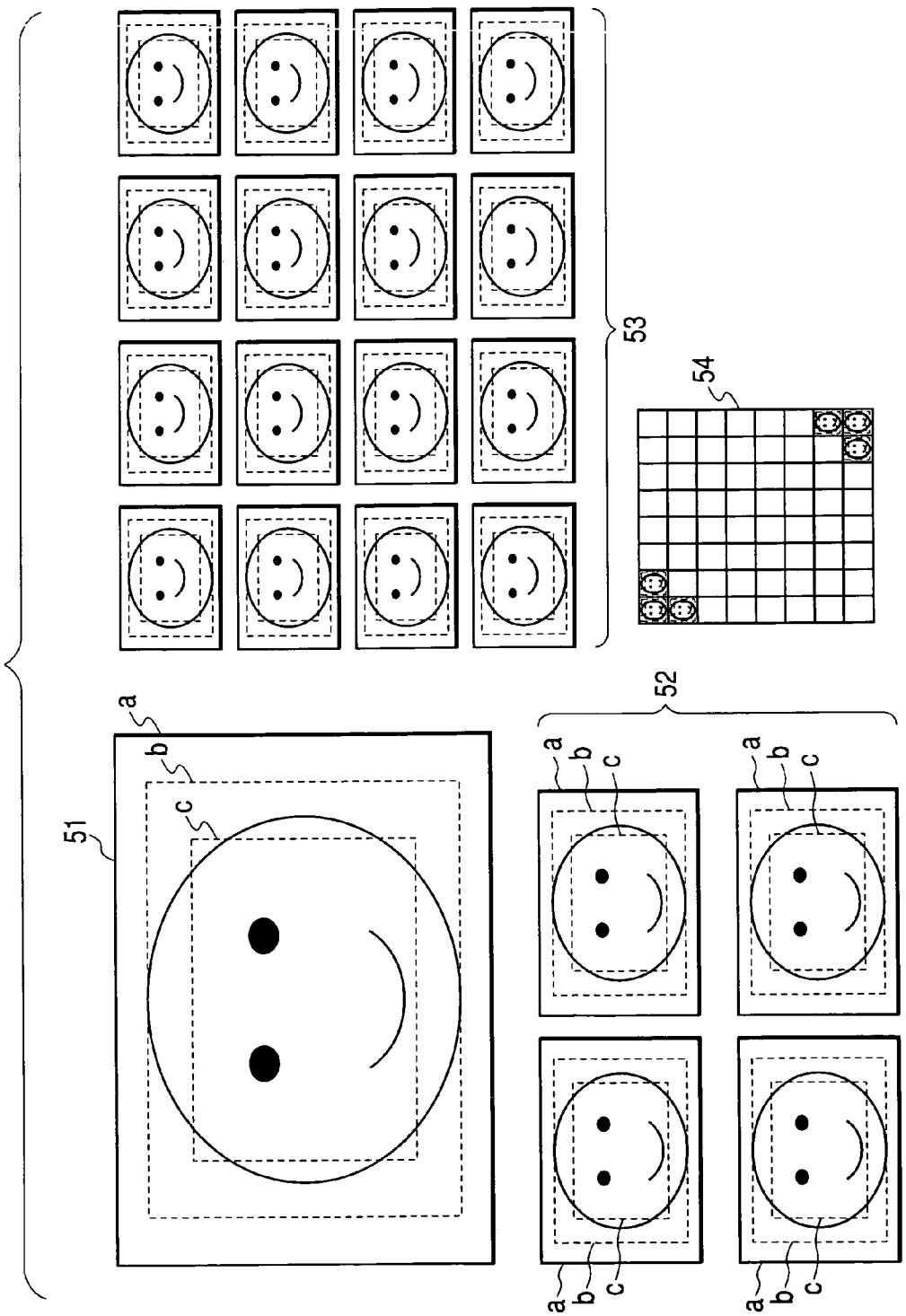
FIG. 6 shows a diagram showing exemplary images derived as a basis of image data to be stored in memory of the digital camera of the second embodiment.

FIG. 6 is a diagram showing an exemplary image based on the image data stored in the memory 47 of the digital camera 40 of the second embodiment.

When a user designates any image for viewing thereof through the operation unit 15 of the digital camera 40, the controller 44 responsively reads original image data of thus designated image from the storage 13 to the memory 47. Then, based on the region of the memory 47 available for data storage, a plurality of reduced image groups are generated for storage into the memory 47. FIG. 6 shows images stored in the memory 47 at this time.

As shown in FIG. 6, the memory 47 stores user-designated original image 51, and reduced image groups 52, 53, and 54. Specifically, the reduced image group 52 includes 4 patterns of reduced image derived by reducing the original image 51 into a half, the reduced image group 53 includes 16 patterns of reduced image derived by reducing the original image 51 into a quarter, and the reduced group 54 includes 64 patterns of reduced image derived by reducing the original image 51 into an eighth. The following shows only the width sizes of these images.

Original image 51: 5120 pixels in width
Image of reduced image group 52: 2560 pixels in width
Image of reduced image group 53: 1280 pixels in width
Image of reduced image group 54: 640 pixels in width (VGA size)

In FIG. 6, similarly to FIG. 2, for each image, indicated is a display area, which is determined by the VGA size and the enlargement ratio (×1, ×2, and ×3) of the image to be displayed on the display 16. Herein, the VGA size is equal to the size of the display image data for output to the display 16.

A reference character a of FIG. 6 denotes the display area when the enlargement ratio of an image to be displayed on the display 16 is ×1, a reference character b denotes the display area for the enlargement ratio of ×2, and a reference character c denotes the display area for the enlargement ratio of ×3. The following shows only the width sizes of these images.

Original image 51: b=4000 pixels in width, c=2400 pixels in width
Image of reduced image group 52: b=2000 pixels in width, c=1200 pixels in width
Image of reduced image group 53: b=1000 pixels in width, c=600 pixels in width
Image of reduced image group 54: b=500 pixels in width, c=300 pixels in width After generating a plurality of reduced image groups, from 64 patterns of reduced image of the reduced image group 54 of VGA size, the controller 44 first selects the reduced image whose pattern is corresponding in position to the display area of the original image 51. Thus selected reduced image is output to the display 16, in which thus input reduced image is displayed on its display screen.

With the reduced image selected from the reduced image group 54 displayed on the display screen, when the user depresses a zoom key once, the controller 44 makes a selection from the original image data and the reduced image groups with the reduced image for those having the display area b larger than the VGA size. In this example, because the VGA size is 640 pixels in width, selected will be the original image 51, and the reduced image groups 52 and 53, all having the larger display area b.

Then, out of thus selected original image 51 and the reduced image groups 52 and 53, the controller 44 selects the reduced image group 53 including the reduced image having the highest reduction ratio. Then, out of the reduced image group 53, selected is the reduced image of a pattern corresponding in position to the display area b on the original image 51 that is determined by the user's operation. Then, an image in the display area b of thus selected reduced image is reduced to the VGA size using a reduction ratio of 640/1000. The resulting image data is then output to the display 16.

With the image derived by doubling in size the reduced image selected from the reduced image group 54 displayed on the display screen, when the user depresses the zoom key once more, the controller 44 makes a selection from the original image data and the reduced image groups with the reduced image data for those having the display area c larger than the VGA size. In this example, because the VGA size is 640 pixels in width, selected will be the original image 51 and the reduced image group 52 both having the larger display area c.

Then, out of the original image 51 and the reduced image group 52, the controller 44 selects the reduced image group 52 having the higher reduction ratio. Then, out of the reduced image group 52, selected is the reduced image of a pattern corresponding in position to the display area c on the original image 51 that is determined by the user's operation. Then, an image in the display area c of thus selected reduced image is reduced to the VGA size using a reduction ratio of 640/1000. The resulting image data is then output to the display 16.

Referring to FIG. 7, described next is the operation of the controller 44 for selecting one reduced image from the reduced image group 52.

FIGS. 7A and 7B are both a diagram showing image data stored in the memory 47. Specifically, FIG. 7A is a diagram showing original image data using as a basis for generating the original image 51, and FIG. 5B is a diagram showing the reduced image group 52 including 4 patterns of reduced image data derived by reducing the original image data of FIG. 7A into a half. Herein, in FIGS. 7A and 7B, for brevity, the original image 51 is 6 by 6 pixels in size, and the display area c on the original image is 3 by 3 pixels in size.

As shown in FIG. 7A, assuming that the pixel 1 on the upper left of the image data is a point of origin, the coordinates of the pixel 1 will be (even number, even number), the coordinates of the pixel 2 will be (odd number, even number), the coordinates of the pixel 3 will be (even number, odd number), and the coordinates of the pixel 4 will be (odd number, odd number).

After selecting the reduced image group 52 of FIG. 7B, the controller 44 defines the display area by position on the image of FIG. 7A. If such a definition tells that the coordinates of the start position of the display area (i.e., position denoted by a reference character A in FIG. 7A) are (even number, even number), the controller 44 selects the reduced image data of a pattern structured by the pixels 1. When the coordinates thereof are (odd number, even number), the controller 44 selects the reduced image data of a pattern structured by the pixels 2. When the coordinates thereof are (even number, odd number), the controller 44 selects the reduced image data of a pattern structured by the pixels 3. And when the coordinates thereof are (odd number, odd number), the controller 44 selects the reduced image data of a pattern structured by the pixels 4.

As such, out of the reduced image data of a plurality of patterns, the controller 44 selects the reduced image data generated by using any pixel corresponding to the start position of the display area of the original image. Thus selected reduced image is then subjected to a reduction process again before output to the display 16.

In such a manner, even if the user moves the image displayed on the display 16, favorably avoided is the image degradation that is often caused by not displaying any pixels having been dropped.

Next, considered is the case where the image displayed on the display 16 is enlarged, and the resulting image is moved on the screen through the cursor key operation. In this case, in association with the movement of the cursor key, the display areas b and c of each image of FIG. 6 also move. Accordingly, the controller 44 controllably switches in a row among reduced images available for selection responding to the movement of the display areas b and c.

In FIGS. 7A and 7B, when the display area is moved in the x direction by a pixel from the start position of (0, 0), the controller 44 responsively selects the reduced image data structured by the pixels 2. When the display area is again moved in the x direction by a pixel, the controller 44 selects this time the reduced image data structured by the pixels 1. As such, in response to the movement of the display area, the controller 44 sequentially changes the reduced image data for selection. In this manner, on the display screen of the display 16, the image derived by reducing the reduced image of FIG. 7B is changed in a row for display.

In the general reduction method, in FIGS. 7A and 7B, even if the display area is moved in the x direction by a pixel from the start position of (0, 0), the reduced image to be selected by the controller 44 is only the reduced image structured by the pixels 1. In this case, no matter if the resulting display area after moved by a pixel includes only two pixels 1, the display 16 displays an image derived by reducing the reduced image structured by the pixels 1. If this is the case, the pixels having been dropped are not displayed when the display area is moved or when any image is enlarged in detail. As a result, pixel interval in the resulting image shows no regularity, failing in smooth image display. On the other hand, with the digital camera 40 of the present embodiment, a plurality of patterns of the reduced image are selectively switched in consideration of the position of the display area. Thus, even if the image is enlarged in the display 16 and the display area is moved, the image display can be smoothly done.

According to the present invention, provided is an image processor with which the image quality remains good through image processing.

The present invention claims foreign priority based on Japanese Patent application no. 2003-134494, filed on May 13, 2003, the contents of which is incorporated herein by reference.

What is claimed is:

1. An image processor for processing an image to be displayed on a display, the image processor comprising:
    a storage that stores original image data and at least one reduced image data that is reduced from the original image data by a predetermined reduction ratio; and
    a display image data generator that generates display image data to be output to the display,
    wherein the display image data generator generates the display image data by applying a reduction process to first image data so that the first image data has a size of the display image data, the first image data being selected from the original image data and the at least one reduced image data in accordance with a size of the display image data and an image enlargement ratio to be displayed on the display.

2. The image processor according to claim 1, wherein the original image data and the at least one reduced image data each has a display area to be displayed on the display in accordance with the image enlargement ratio.

3. The image processor according to claim 1,
    wherein the display image data generator applies the reduction process to the first image data; each of the original image data and the at least one reduced image data has the display area; the display area is determined in accordance with the size of the display image data and the image enlargement ratio; and the first image data has the highest reduction ratio among image data each of which display area is larger than the size of the display image data.

4. The image processor according to claim 1, which further comprises a first reduced image data generator that generates the at least one reduced image data that is reduced from the original image data by a predetermined reduction ratio.

5. The image processor according to claim 1, which further comprises a second reduced image data generator that generates plural the reduced image data every different reduction ratio depending on a size of a region of the storage available for data storage.

6. The image processor according to claim 1, wherein the at least one reduced image data stored in the storage has a plurality of patterns that are generated through pixel displacement with the same reduction ratio at a time of generating the reduced image data from the original image data;
    the display image data generator applies the reduction process to the first image data that forms a pattern corresponding in position to the display area on the original image data; each of the original image data and the plurality of patterns of the reduced image data has the display area; the display area is determined in accordance with the size of the display image data and the image enlargement ratio; and the first image data has the highest reduction ratio among image data each of which display area is larger than the size of the display image data.

7. The image processor according to claim 6, wherein the display image data generator applies the reduction process to various-patterned reduced image data, the various-patterned reduced image data being sequentially changed responding to a movement of the display area on the original image data.

8. An image processor for processing an image to be displayed on a display, the image processor comprising:
    means for storing original image data and at least one reduced image data that is reduced from the original image data by a predetermined reduction ratio; and
    means for generating a display image data to be output to the display,
    wherein the means for generating the display image data apply a reduction process to first image data so that the first image data has a size of the display image data, the first image data being selected from the original image data and the at least one reduced image data in accordance with a size of the display image data and an image enlargement ratio to be displayed on the display.

9. The image processor according to claim 8, wherein the original image data and the at least one reduced image data each has a display area to be displayed on the display in accordance with the enlargement ratio.

10. The image processor according to claim 8,
    wherein the means for generating the display image data apply the reduction process to the first image data that forms the display area; each of the original image data and the at least one reduced image data has the display area; the display area is determined in accordance with the size of the display image data and the image enlargement ratio; and the first image data has the highest reduction ratio among image data each of which display area is larger than the size of the display image data.

11. The image processor according to claim 8, which further comprises first means for generating reduced image data that generate the at least one reduced image data that is reduced the original image data by a predetermined reduction ratio.

12. The image processor according to claim 8, which further comprises second means for generating reduced image data that generate plural the reduced image data every different reduction ratio depending on a size of a region of the storage available for data storage.

13. The image processor according to claim 8, wherein the at least one reduced image data stored in the storage has a plurality of patterns that are generated through pixel displacement with the same reduction ratio at a time of generating the reduced image data from the original image data;
    the means for generating the display image data apply the reduction process to the first image data that forms a pattern corresponding in position to the display area on the original image data; each of the original image data and the plurality of patterns of the reduced image data has the display area; the display area is determined in accordance with the size of the display image data and the image enlargement ratio; and the first image data has the highest reduction ratio among image data each of which display area is larger than the size of the display image data.

14. The image processor according to claim 13, wherein the means for generating the display image data apply the reduction process to various-patterned reduced image data, the various-patterned reduced image data being sequentially changed responding to a movement of the display area on the original image data.

* * * * *